United States Patent
Sun et al.

(10) Patent No.: US 12,307,583 B2
(45) Date of Patent: May 20, 2025

(54) DISPLAY DEVICE AND NON-TRANSITORY COMPUTER-READABLE MEDIUM STORING A COMPUTER PROGRAM

(71) Applicant: FANUC CORPORATION, Yamanashi (JP)

(72) Inventors: Quan Sun, Yamanashi (JP); Ryosuke Okuta, Tokyo (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/839,263

(22) PCT Filed: Mar. 1, 2022

(86) PCT No.: PCT/JP2022/008602
§ 371 (c)(1),
(2) Date: Aug. 16, 2024

(87) PCT Pub. No.: WO2023/166560
PCT Pub. Date: Sep. 7, 2023

(65) Prior Publication Data
US 2025/0111595 A1  Apr. 3, 2025

(51) Int. Cl.
*G06T 15/50* (2011.01)

(52) U.S. Cl.
CPC .................. *G06T 15/50* (2013.01)

(58) Field of Classification Search
CPC ....... G06T 15/50; G06T 15/506; G06T 15/55; G06T 2207/10152; G06T 3/08; G06T 3/108
See application file for complete search history.

(56) References Cited

U.S. PATENT DOCUMENTS

2007/0176927 A1* 8/2007 Kato .................. G06T 7/586
345/426
2018/0253885 A1 9/2018 Xie et al.

FOREIGN PATENT DOCUMENTS

JP 2000-235589 A 8/2000
JP 2004-234524 A 8/2004
(Continued)

OTHER PUBLICATIONS

International Search Report issued in PCT/JP2022/008602; mailed May 17, 2022.

*Primary Examiner* — Hau H Nguyen
(74) *Attorney, Agent, or Firm* — Studebaker Brackett PLLC

(57) ABSTRACT

Provided are a display device and a computer program that enable the burden on a worker to be reduced. The display device comprises: a normal vector extraction unit that extracts a normal vector of a machined surface constituent element on the basis of shape information of a machined surface that is constituted by the machined surface constituent element; a brightness calculation unit that calculates the brightness of the machined surface constituent element on the basis of the normal vector; and a display unit that generates a graphical display of the machined surface on the basis of the brightness of the machined surface constituent element. The brightness calculation unit calculates the brightness of the machined surface constituent element on the basis of an adjusted angle obtained by multiplying an angle formed by the normal vector with each axis of a three-dimensional space, by a prescribed adjustment magnification.

9 Claims, 6 Drawing Sheets

(56) References Cited

FOREIGN PATENT DOCUMENTS

| | | | |
|---|---|---|---|
| JP | 2008-077371 | A | 4/2008 |
| JP | 2014-212422 | A | 11/2014 |
| JP | 2017-138726 | A | 8/2017 |

\* cited by examiner

New Vector $(x_1', y_1', z_1')$

Normalized New Vector $(x_1'', y_1'', z_1'')$ $\alpha_2 = \arccos(x_2/1)$
$\beta_2 = \arccos(y_2/1)$
$\gamma_2 = \arccos(z_2/1)$ $\alpha_2' = \text{level} * \alpha_2$
$\beta_2' = \text{level} * \beta_2$
$\gamma_2' = \text{level} * \gamma_2$ $x_2' = \cos(\alpha_2') *1$
$y_2' = \cos(\beta_2') *1$
$z_2' = \cos(Y_2') *1$ New Vector $(x_2', y_2', z_2')$ Normalized New Vector $(x_2'', y_2'', z_2'')$

DISPLAY DEVICE AND NON-TRANSITORY COMPUTER-READABLE MEDIUM STORING A COMPUTER PROGRAM

TECHNICAL FIELD

The present disclosure relates to a display device and a non-transitory computer-readable medium storing a computer program.

BACKGROUND ART

A display device that displays a machined surface of a workpiece in three-dimensional computer graphics has been known (see, for example, see Patent Document 1). An operator checks results displayed on such a display device and determines the quality of the machined surface based on unevenness of the machined surface. The quality of the machined surface is determined by observing a difference in brightness between polygons constituting the machined surface. Therefore, the larger the difference in brightness, the easier it becomes to observe the unevenness of the machined surface and to determine the quality of the machined surface.

As illustrated in FIG. 5, according to a typical method based on three-dimensional computer graphics, the brightness of a polygon is determined from a relationship between a direction vector from the polygon toward a light source and a normal vector of the polygon. In this case, in order to increase the difference in brightness between polygons, it is necessary to appropriately adjust the position of the light source with respect to the orientation of the machined surface.

CITATION LIST

Patent Document

Patent Document 1: Japanese Unexamined Patent Application, Publication No. 2017-138726

DISCLOSURE OF THE INVENTION

Problems to be Solved by the Invention

Incidentally, in the case of checking a flaw, a stripe pattern, or the like on a machined surface, it is necessary to adjust the position of a light source so as to increase a difference in brightness between polygons constituting the flaw, the stripe pattern, or the like. However, the adjustment of the position of the light source requires, for example, adjustment of a plurality of parameters, and therefore, takes time and effort, which has been a considerable burden on the operator.

Means for Solving the Problems

A display device according to the present disclosure includes: a normal vector extraction unit configured to extract, based on shape information regarding a machined surface that is constituted by machined surface constituent elements, a normal vector of each machined surface constituent element; a brightness calculation unit configured to calculate brightness of each machined surface constituent element based on the normal vector; and a display unit configured to graphically display the machined surface based on the brightness of each machined surface constituent element. The brightness calculation unit calculates adjusted angles by multiplying angles that the normal vector forms with axes of a three-dimensional space by a predetermined adjustment multiplying factor, and calculates the brightness of each machined surface constituent element based on the adjusted angles.

A non-transitory computer-readable medium storing a computer program according to the present disclosure is for causing a computer to perform operations including: extracting, based on shape information regarding a machined surface that is constituted by machined surface constituent elements, a normal vector of each machined surface constituent element; calculating brightness of each machined surface constituent element based on the normal vector; and graphically displaying the machined surface based on the brightness of each machined surface constituent element. The calculating the brightness includes calculating adjusted angles by multiplying angles that the normal vector forms with axes of a three-dimensional space by a predetermined adjustment multiplying factor, and calculating the brightness of each machined surface constituent element based on the adjusted angles.

The display device and the non-transitory computer-readable medium storing the computer program of the present disclosure are capable of reducing the burden on the operator.

PREFERRED MODE FOR CARRYING OUT THE INVENTION

An embodiment of the present invention will be described in detail with reference to the drawings.

Figure 1:
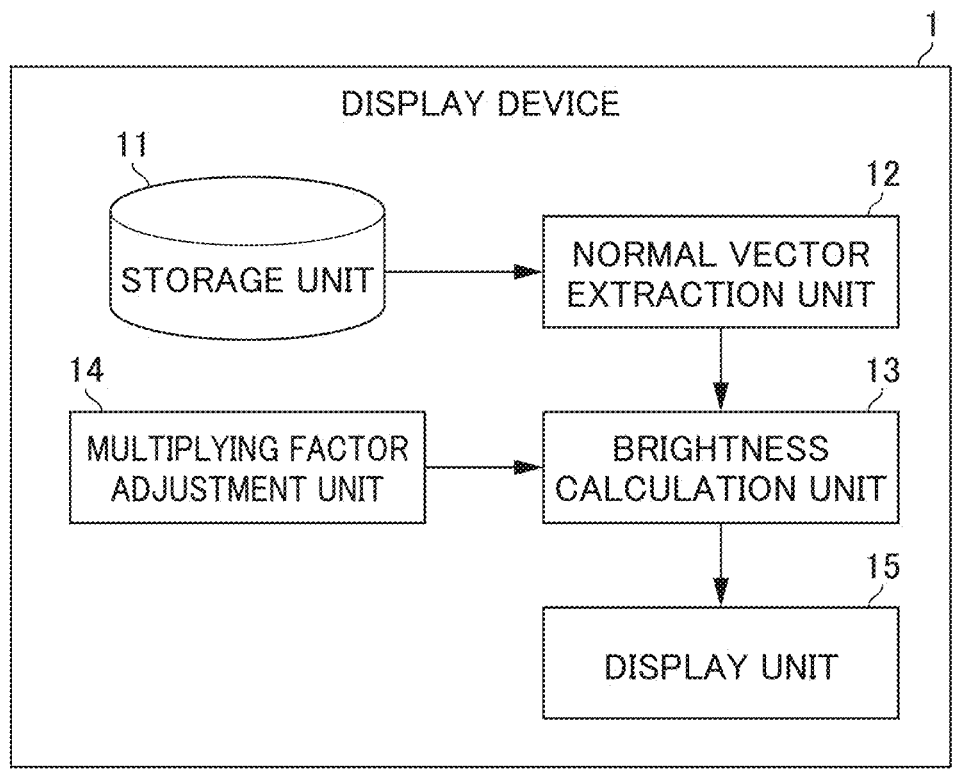
FIG. 1 is a diagram illustrating an outline of a display device according to an embodiment of the present disclosure.

FIG. 1 is a diagram illustrating an outline of a display device 1 according to an embodiment of the present embodiment. The present embodiment provides the display device 1 and a non-transitory computer-readable medium storing a computer program that eliminate the need to adjust the position of a light source and are capable of reducing the burden on an operator.

The display device 1 is constituted by, for example, a computer including a memory such as a read only memory (ROM) and a random access memory (RAM), a central processing unit (CPU), and a communication control unit, which are connected to one another via a bus. As illustrated in FIG. 1, the display device 1 includes a storage unit 11, a normal vector extraction unit 12, a brightness calculation unit 13, a multiplying factor adjustment unit 14, and a display unit 15. The functions and operations of these units are implemented by cooperation of the CPU and the memory incorporated in the computer, and a control program stored in the memory.

The storage unit 11 stores shape information regarding a machined surface that is constituted by machined surface constituent elements. The shape information is composed of a plurality of pieces of element information relating to polygons or pixels. Each of the plurality of constituent elements has a vertex of a polygon, a normal vector of a plane where a polygon is located, or a normal vector of a plane where a pixel is located.

Based on the shape information regarding the machined surface constituted by the machined surface constituent elements, the normal vector extraction unit 12 extracts a normal vector of each machined surface constituent element. In a case where the shape information does not include a normal vector, the normal vector extraction unit 12 calculates a normal vector from the vertex of the polygon or the pixel included in the shape information and extracts the normal vector.

The brightness calculation unit 13 calculates brightness of each machined surface constituent element, based on adjusted angles given by multiplying angles that the normal vector forms with the axes of a three-dimensional space by a predetermined adjustment multiplying factor. Specifically, the brightness calculation unit 13 calculates a vector in the three-dimensional space based on the adjusted angles, and calculates the brightness of each machined surface constituent element based on the sum of addition of the three dimensional spatial components of the vector. For example, the brightness calculation unit 13 calculates the brightness of each machined surface constituent element by the following method.

First, the brightness calculation unit 13 calculates, using an inverse trigonometric function, angles that a normal vector of a polygon or a normal vector of a pixel forms with the X axis, the Y axis, and the Z axis. Next, the brightness calculation unit 13 multiplies each of the calculated angles by a predetermined adjustment multiplying factor to thereby calculate adjusted angles. Next, based on the adjusted angles, the brightness calculation unit 13 calculates a new vector, using a trigonometric function. Next, the brightness calculation unit 13 normalizes the new vector, and adds the components of the normalized new vector together. Since the sum of the addition is in the range of $-(3^{1/2})$ to $3^{1/2}$, the brightness calculation unit 13 converts the sum of the addition into a range of brightness. In a case where the range of brightness is set to 0.0 to 1.0, the conversion formula is expressed as follows: Brightness=((sum of addition)+$3^{1/2}$)/($2 \times 3^{1/2}$).

The multiplying factor adjustment unit 14 arbitrarily sets the adjustment multiplying factor for use for the calculation by the brightness calculation unit 13, based on arbitrary information received by the computer. Thus, the adjustment multiplying factor is changed as appropriate. As the adjustment multiplying factor is set larger, a difference in brightness becomes larger, whereby an image in which the brightness is more emphasized can be displayed.

The display unit 15 graphically displays the machined surface based on the brightness of the machined surface constituent elements.

FIGS. 2A to 2E and FIGS. 3A to 3E are diagrams illustrating examples of the calculation by the brightness calculation unit 13. Here, the calculation will be described by referring to normal vectors of two polygons 1 and 2 that are adjacent to each other, as an example. In these diagrams, the Z axis is omitted for the sake of convenience.

Figure 2A:
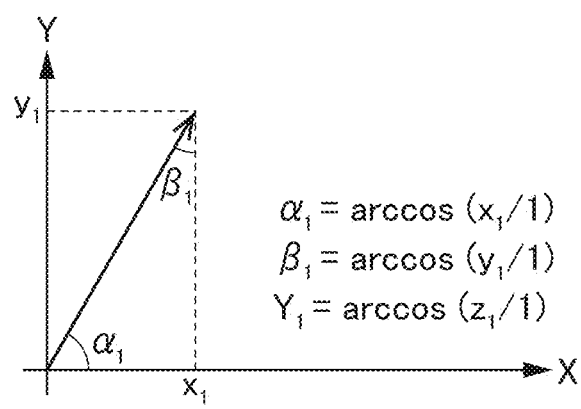
FIG. 2A is a diagram illustrating an example of calculation by a brightness calculation unit, and shows angles that a normal vector of a polygon 1 forms with axes.
Figure 3A:
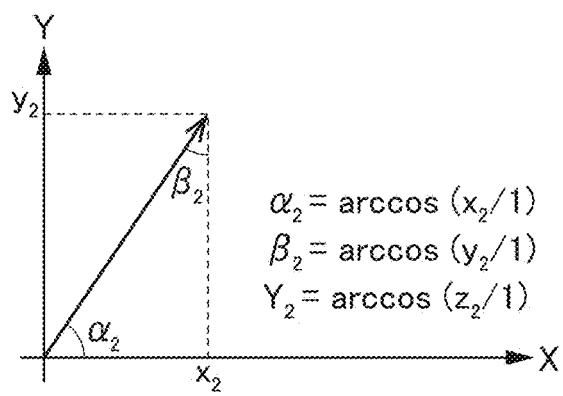
FIG. 3A is a diagram illustrating an example of calculation by the brightness calculation unit, and shows angles that a normal vector of a polygon 2 forms with axes.

FIG. 2A is a diagram illustrating angles that a normal vector of the polygon 1 forms with the axes. FIG. 3A is a diagram illustrating angles that a normal vector of the polygon 2 forms with the axes. As illustrated in FIG. 2A, the brightness calculation unit 13 calculates, by using an inverse trigonometric function, the angles ($\alpha_1$, $\beta_1$, $\gamma_1$) that the normal vector ($x_1$, $y_1$, $z_1$) of the polygon 1 forms with the X axis, the Y axis, and the Z axis, as follows: $\alpha_1$=arccos($x_1$/1), $\beta_1$=arccos($y_1$/1), and $\gamma_1$=arccos($z_1$/1). Likewise, as illustrated in FIG. 3A, the brightness calculation unit 13 calculates, by using the inverse trigonometric function, the angles ($\alpha_2$, $\beta_2$, $\gamma_2$) that the normal vector ($x_2$, $y_2$, $z_2$) of the polygon 2 forms with the X axis, the Y axis, and the Z axis, as follows: $\alpha_2$=arccos ($x_2$/1), $\beta_2$=arccos($y_2$/1), and $\gamma 2$=arccos ($z_2$/1).

Figure 2B:
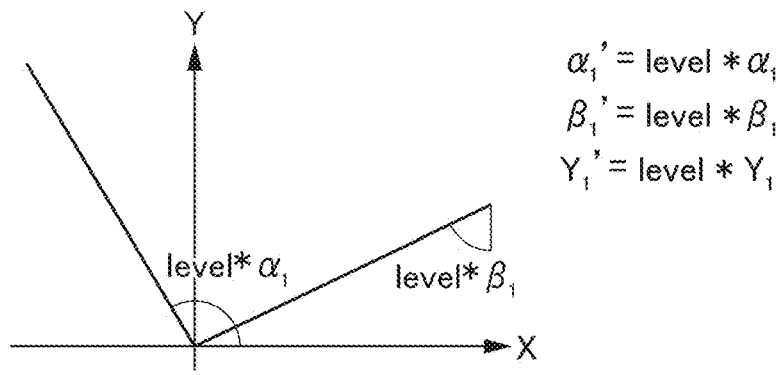
FIG. 2B is a diagram illustrating an example of calculation by the brightness calculation unit, and shows adjusted angles given by multiplying the angles that the normal vector of the polygon 1 forms with the axes by an adjustment multiplying factor "level"
Figure 3B:
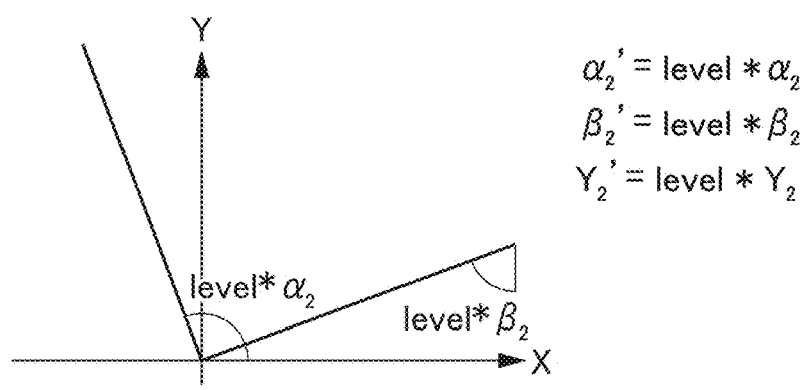
FIG. 3B is a diagram illustrating an example of calculation by the brightness calculation unit, and shows adjusted angles given by multiplying the angles that the normal vector of the polygon 2 forms with the axes by an adjustment multiplying factor "level"

FIG. 2B is a diagram illustrating adjusted angles given by multiplying the angles that the normal vector of the polygon 1 forms with the axes by a multiplying factor "level". FIG. 3B is a diagram illustrating adjusted angles given by multiplying the angles that the normal vector of the polygon 2 forms with the axes by the multiplying factor "level". As illustrated in FIG. 2B, the brightness calculation unit 13 multiplies each of the angles ($\alpha_1$, $\beta_2$, $\gamma_1$) calculated in the manner illustrated in FIG. 2A by the predetermined adjustment multiplying factor "level" to thereby calculate the adjusted angles ($\alpha_1'$, $\beta_1'$, $\gamma_1'$) as follows: $\alpha_1'$=level×$\alpha_1$, $\beta_1'$=level×$\beta_1$, and $\gamma_1'$=level×$\gamma_1$. Likewise, as illustrated in FIG. 3B, the brightness calculation unit 13 multiplies each of the angles ($\alpha_2$, $\beta_2$, $\gamma_2$) calculated in the manner illustrated in FIG. 3A by the predetermined adjustment multiplying factor "level" to thereby calculate the adjusted angles ($\alpha_1'$, $\beta_1'$, $\gamma_1'$) as follows: $\alpha_2'$=level×$\alpha_2$, $\beta_2'$=level×$\beta_2$, and $\gamma_2'$=level×$\gamma_2$. The adjustment multiplying factor "level" is set to, for example, 2 or 5.

Figure 2C:
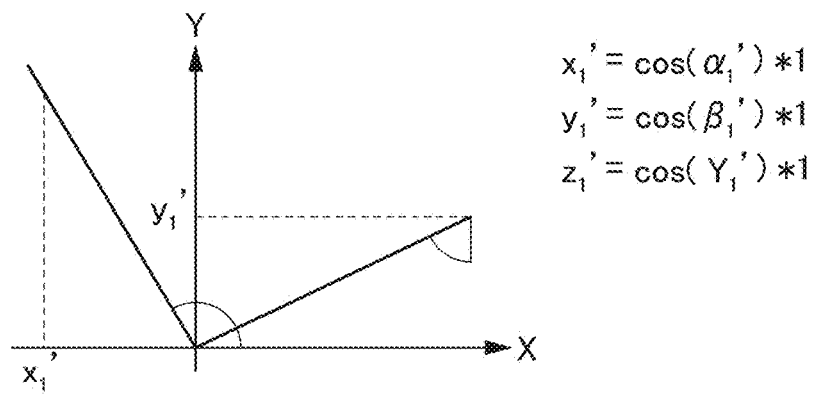
FIG. 2C is a diagram illustrating an example of calculation by the brightness calculation unit, and shows components of a new vector that is based on the adjusted angles in FIG. 2B.

FIG. 2C is a diagram illustrating components of a new vector that is based on the adjusted angles in FIG. 2B. FIG.

Figure 3C:
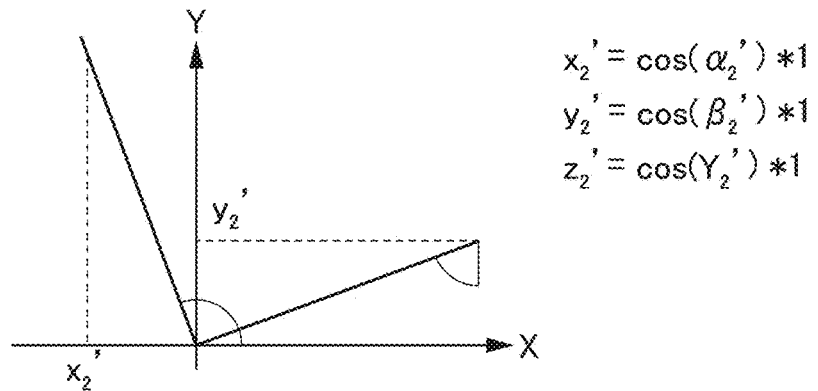
FIG. 3C is a diagram illustrating an example of calculation by the brightness calculation unit, and shows components of a new vector that is based on the adjusted angles in FIG. 3B.

3C is a diagram illustrating components of a new vector that is based on the adjusted angles in FIG. 3B. As illustrated in FIG. 2C, the brightness calculation unit 13 calculates, using a trigonometric function, the components of the new vector $(x_1', y_1', z_1')$ based on the adjusted angles $(\alpha_1', \beta_1', \gamma_1')$, as follows: $x_1'=\cos(\alpha_1')\times 1$, $y_1'=\cos(\beta_1')\times 1$, and $z_1'=\cos(\gamma_1')\times 1$. Likewise, as illustrated in FIG. 3C, the brightness calculation unit 13 calculates, by using the trigonometric function, the components of the new vector $(x_2', y_2', z_2')$ based on the adjusted angles $(\alpha_2', \beta_2', \gamma_2')$, as follows: $x_2'=\cos(\alpha_2')\times 1$, $y_2'=\cos(\beta_2')\times 1$, and $z_2'=\cos(\gamma_2')\times 1$.

Figure 2D:
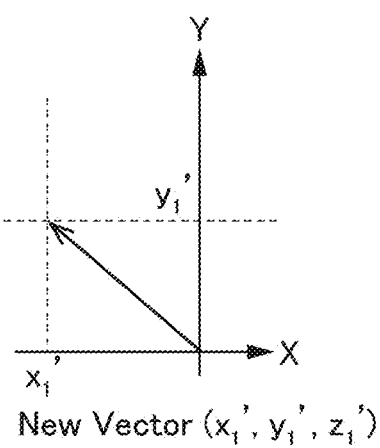
FIG. 2D is a diagram illustrating an example of calculation by the brightness calculation unit, and shows the new vector that is based on the adjusted angles in FIG. 2B.
Figure 3D:
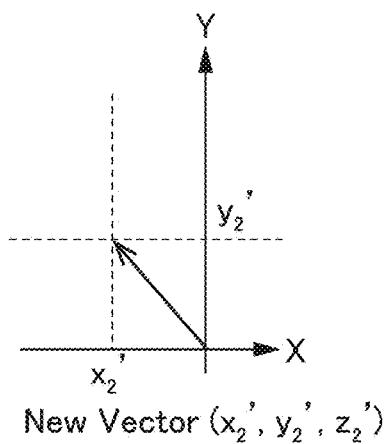
FIG. 3D is a diagram illustrating an example of calculation by the brightness calculation unit, and shows the new vector that is based on the adjusted angles in FIG. 3B.

FIG. 2D is a diagram illustrating the new vector that is based on the adjusted angles in FIG. 2B. FIG. 3D is a diagram illustrating the new vector that is based on the adjusted angles in FIG. 3B. As illustrated in FIG. 2D, the brightness calculation unit 13 obtains the new vector based on the components calculated in the manner illustrated in FIG. 2C. Likewise, as illustrated in FIG. 3D, the brightness calculation unit 13 obtains the new vector based on the components calculated in the manner illustrated in FIG. 3C.

Figure 2E:
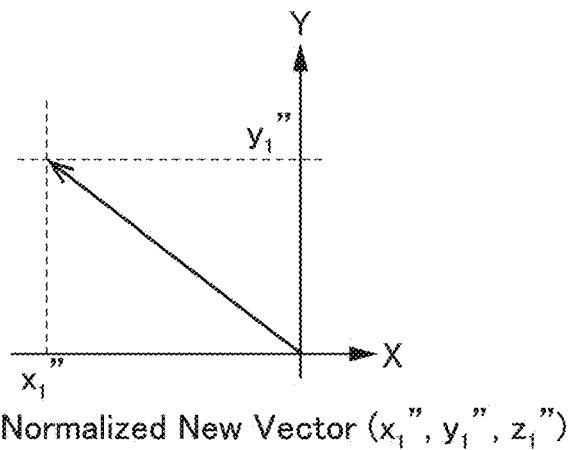
FIG. 2E is a diagram illustrating an example of calculation by the brightness calculation unit, and shows the new vector in FIG. 2D, which is normalized.
Figure 3E:
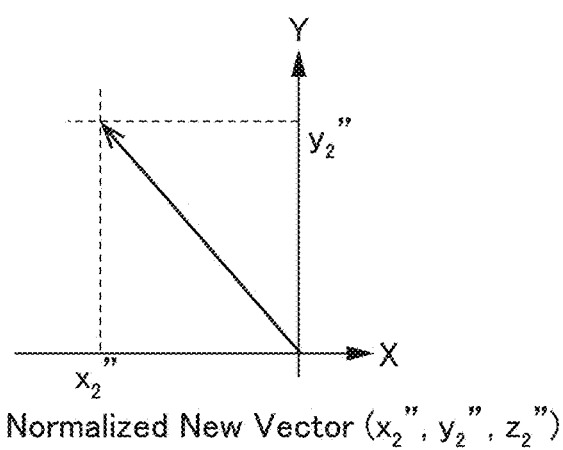
FIG. 3E is a diagram illustrating an example of calculation by the brightness calculation unit, and shows the new vector in FIG. 3D, which is normalized.

FIG. 2E is a diagram illustrating the new vector in FIG. 2D, which is normalized. FIG. 3E is a diagram illustrating the new vector in FIG. 3D, which is normalized. As illustrated in FIG. 2E, the brightness calculation unit 13 normalizes the new vector $(x_1', y_1', z_1')$, and adds components of the normalized new vector $(x_1'', y_1'', z_1'')$ together. Likewise, as illustrated in FIG. 3E, the brightness calculation unit 13 normalizes the new vector $(x_2', y_2', z_2')$, and adds components of the normalized new vector $(x_2'', y_2'', z_2'')$ together.

Here, the brightness calculation unit 13 converts the sum of the addition, $x_1''+y_1''+z_1''$, into a brightness range. In a case where the brightness range is set to 0.0 to 1.0, the conversion formula is expressed as follows: Brightness=$((x_1''+y_1''+z_1'')+3^{1/2})/(2\times 3^{1/2})$. Likewise, the brightness calculation unit 13 converts the sum of the addition, $x_2''+y_2''+z_2''$ into a brightness range. In a case where the brightness range is set to 0.0 to 1.0, the conversion formula is expressed as follows: Brightness=$((x_2''+y_2''+z_2'')+3^{1/2})/(2\times 3^{1/2})$.

Figure 6:
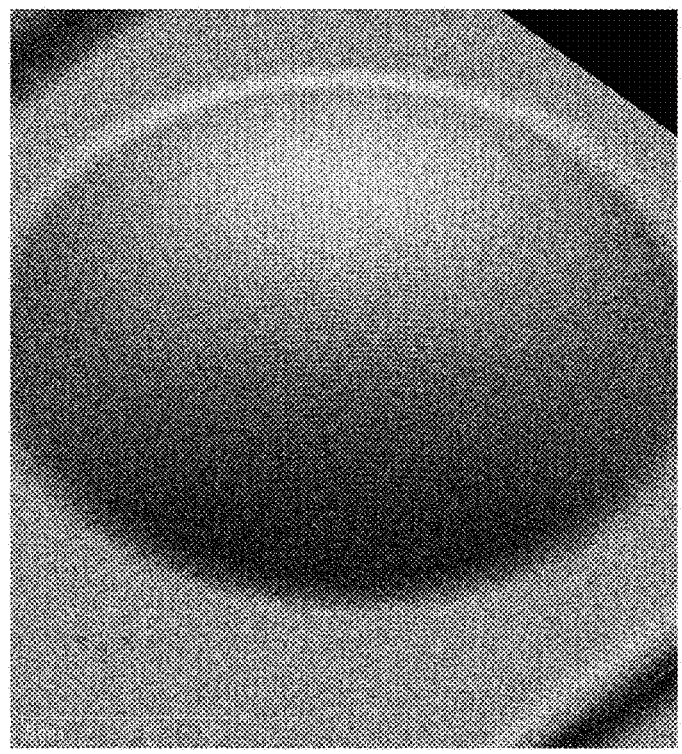
FIG. 6 is an image that is displayed by a display device according to an embodiment of the present disclosure.
Figure 7:
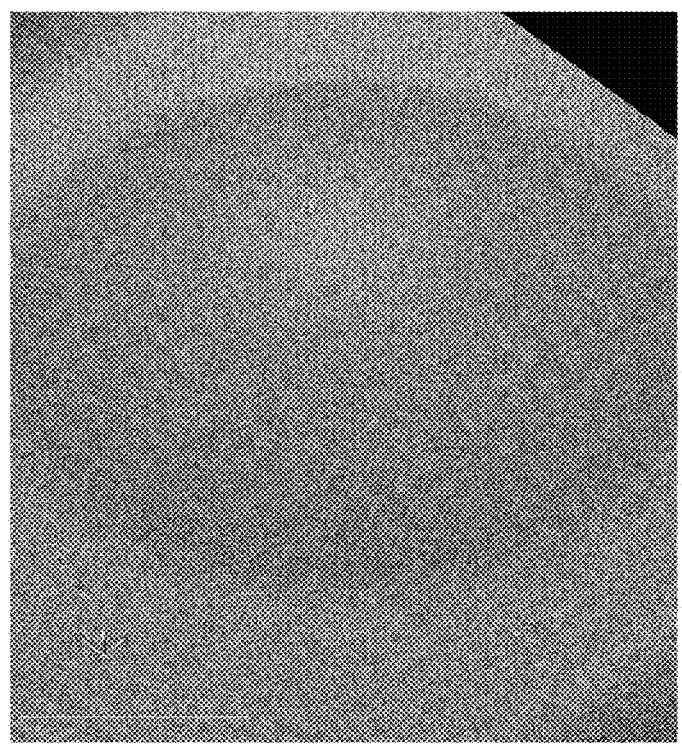
FIG. 7 is an image that is displayed by a display device of the known art.

FIG. 6 is an image that is displayed by the display device 1 according to the present embodiment. FIG. 7 is an image that is displayed by a display device of the known art. The image of FIG. 6 is displayed with the above-described adjustment multiplying factor "level" set to 5. From these figures, it can be appreciated that, the image in FIG. 6, which is displayed by the display device 1 according to the present embodiment, makes it possible for an operator to check a flaw and a stripe pattern on the machined surface more clearly than the image in FIG. 7, which is displayed by the display device of the known art.

The present embodiment exerts the following effects.

The display device 1 according to the present embodiment includes the normal vector extraction unit 12 that extracts, based on shape information regarding a machined surface that is constituted by the machined surface constituent elements, a normal vector of each machined surface constituent element, the brightness calculation unit 13 that calculates brightness of each machined surface constituent element based on the normal vector, and the display unit 15 that graphically displays the machined surface based on the brightness of each machined surface constituent element. The brightness calculation unit 13 is configured to calculate the adjusted angles by multiplying the angles that the normal vector forms with the axes of a three-dimensional space by a predetermined adjustment multiplying factor, and to calculate the brightness of each machined surface constituent element based on the adjusted angles.

Figure 4:
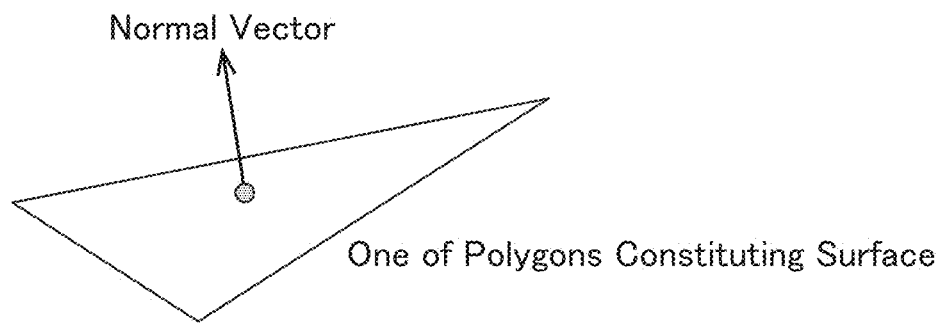
FIG. 4 is a diagram illustrating an example of a brightness calculation method according to an embodiment of the present disclosure.
Figure 5:
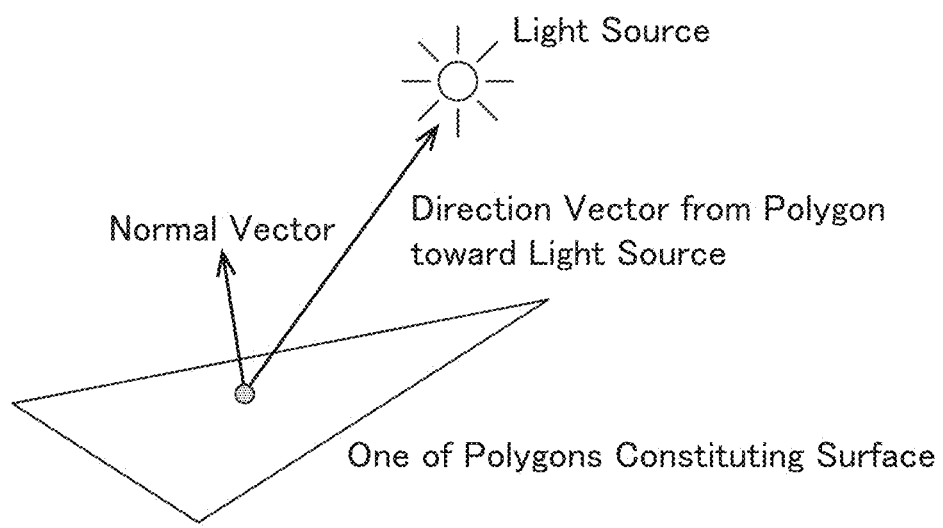
FIG. 5 is a diagram illustrating an example of a brightness calculation method of the known art.

Thus, unlike the conventional brightness calculation method illustrated in FIG. 5, the display device 1 according to the present embodiment can calculate the brightness based only on the normal vector regardless of the light source, as illustrated in FIG. 4. Therefore, unlike the conventional brightness calculation method, the present embodiment eliminates the need for appropriate adjustment of the position of the light source, and can reduce the burden on the operator.

In particular, the present embodiment makes it possible for the operator to check a flaw, a stripe pattern, or the like of a machined surface more clearly than the known art in the following cases, for example: where a normal vector has only a slight inclination, where a polygon is minute and a difference in brightness is not sufficient, where light from a light source hits a step perpendicularly to the step, where a light source is present on the bisector of an angle formed by polygons adjacent to each other and a difference in brightness is not sufficient.

According to the display device 1 of the present embodiment, the shape information is composed of the plurality of pieces of element information relating to polygons or pixels, and each of the plurality of pieces of element information has a normal vector of a plane where the polygon is located or a normal vector of a plane where the pixel is located.

Due to this feature, even when the shape information is composed of the plurality of pieces of element information related to polygons or pixels, the above-described effect can be reliably obtained. That is, the present disclosure is applicable to any shape information from which a plane can be specified.

The display device 1 according to the present embodiment further includes the multiplying factor adjustment unit 14 that sets the adjustment multiplying factor.

Due to this feature, the adjustment multiplying factor can be arbitrarily changed by means of the multiplying factor adjustment unit 14, thereby making it possible to obtain a display image in which a brightness difference is emphasized.

According to the display device 1 of the present embodiment, the brightness calculation unit 13 calculates a vector in a three-dimensional space based on the adjusted angles, and calculates the brightness of each machined surface constituent element based on the sum of the addition of the three dimensional spatial components of the vector.

This feature makes it possible to reliably exert the above-described effects.

Furthermore, the present embodiment relates to a non-transitory computer-readable medium storing a computer program according to which the above-described display device 1 operates. The non-transitory computer-readable medium storing the computer program causes the computer constituting the display device 1 to perform steps including: a normal vector extraction step of extracting, based on shape information regarding a machined surface that is constituted by machined surface constituent elements, a normal vector of each machined surface constituent element; a brightness calculation step of calculating brightness of each machined surface constituent element based on the normal vector; and a display step of graphically displaying the machined surface based on the brightness of each machined surface constituent element. In addition, in the brightness calculation step, adjusted angles are calculated by multiplying angles that the normal vector forms with axes of a three-dimensional space by a predetermined adjustment multiplying factor, and the brightness of each machined surface constituent element is calculated based on the adjusted angles.

Due to this feature, the non-transitory computer-readable medium storing the computer program of the present embodiment can exert the same effects as those described above.

It should be noted that the present disclosure is not limited to the above-described embodiments, and modifications and improvements within a range in which the object of the present disclosure can be achieved are encompassed in the scope of the present disclosure.

The display device of the present disclosure may be applied as a display device for an ordinary external computer. For example, the display device of the present disclosure may be applied as a display unit of a machining simulator. In the case where the display device of the present disclosure is applied to the display unit of the machining simulator, it is possible to accurately evaluate unevenness, a flaw, or the like on a machined surface after machining simulation.

EXPLANATION OF REFERENCE NUMERALS

1: Display device
11: Storage unit
12: Normal vector extraction unit
13: Brightness calculation unit
14: Multiplying factor adjustment unit
15: Display unit

The invention claimed is:

1. A display device comprising:
a normal vector extraction unit configured to extract, based on shape information regarding a machined surface that is constituted by machined surface constituent elements, a normal vector of each machined surface constituent element;
a brightness calculation unit configured to calculate brightness of each machined surface constituent element based on the normal vector; and
a display unit configured to graphically display the machined surface based on the brightness of each machined surface constituent element, wherein
the brightness calculation unit calculates adjusted angles by multiplying angles that the normal vector forms with axes of a three-dimensional space by a predetermined adjustment multiplying factor, and calculates the brightness of each machined surface constituent element based on the adjusted angles.

2. The display device according to claim 1, wherein
the shape information is composed of a plurality of pieces of element information relating to polygons or pixels, and each of the plurality of pieces of element information has a normal vector of a plane where the polygon is located or a normal vector of a plane where the pixel is located.

3. The display device according to claim 1, further comprising
a multiplying factor adjustment unit configured to set the adjustment multiplying factor.

4. The display device according to claim 1, wherein
the brightness calculation unit calculates a vector in the three-dimensional space based on the adjusted angles, and calculates the brightness of each machined surface constituent element based on a sum of addition of three dimensional spatial components of the vector.

5. A non-transitory computer-readable medium storing a computer program for causing a computer to perform operations comprising:
extracting, based on shape information regarding a machined surface that is constituted by machined surface constituent elements, a normal vector of each machined surface constituent element;
calculating brightness of each machined surface constituent element based on the normal vector; and
graphically displaying the machined surface based on the brightness of each machined surface constituent element, wherein
the calculating the brightness includes calculating adjusted angles by multiplying angles that the normal vector forms with axes of a three-dimensional space by a predetermined adjustment multiplying factor, and calculating the brightness of each machined surface constituent element based on the adjusted angles.

6. The display device according to claim 2, further comprising
a multiplying factor adjustment unit configured to set the adjustment multiplying factor.

7. The display device according to claim 2, wherein
the brightness calculation unit calculates a vector in the three-dimensional space based on the adjusted angles, and calculates the brightness of each machined surface constituent element based on a sum of addition of three dimensional spatial components of the vector.

8. The display device according to claim 3, wherein
the brightness calculation unit calculates a vector in the three-dimensional space based on the adjusted angles, and calculates the brightness of each machined surface constituent element based on a sum of addition of three dimensional spatial components of the vector.

9. The display device according to claim 6, wherein
the brightness calculation unit calculates a vector in the three-dimensional space based on the adjusted angles, and calculates the brightness of each machined surface constituent element based on a sum of addition of three dimensional spatial components of the vector.

* * * * *